Feb. 13, 1945. W. MacWILLIAM ET AL 2,369,359
MATERIAL FEEDING APPARATUS
Filed May 14, 1943  2 Sheets-Sheet 2

INVENTORS
WALLACE MacWILLIAM
AND KARL PAPE
BY
ATTORNEYS

Patented Feb. 13, 1945

2,369,359

UNITED STATES PATENT OFFICE 2,369,359

MATERIAL FEEDING APPARATUS

Wallace MacWilliam, Nutley, and Karl Pape, Dover, N. J., assignors to Resistoflex Corporation, Belleville, N. J., a corporation of New York Application May 14, 1943, Serial No. 487,002

9 Claims. (Cl. 18—12)

This invention relates to the feeding of materials and more particularly to apparatus for charging or delivering to molding presses, extruders and the like, particulate materials such as powder, flakes, granules or agglomerates in a dry or semi-dry state.

In the forming of plastics by means of extruders or molding presses, in which the unformed plastic raw material is converted from a particulate form into a solid article, some means is frequently required for delivering the loose raw material to the feed screw or plunger of the extruder or press. Some of the materials generically described as "plastics" are, in the raw or unformed state, in the form of powders, granules or loosely bonded agglomerates and cannot be successfully operated upon by the usual feeding devices which move the material through the forming device proper, such as the regular feed screw of an extruder, for example, unless they are delivered to that feeding device under a certain amount of pressure, so that the material is sufficiently compacted to be properly acted upon by such feeding devices.

The principal object of the invention is the provision of a unitary feeding device for receiving loose bulk materials and delivering them under constant flow and with positive pressure into a forming machine.

Another object is to provide such a feeding device which is adaptable to forming machines of various types and which may be constructed as an integral part thereof or as an accessory thereto.

Another object is to provide apparatus which will receive a supply of loose bulk material, maintain it under constant agitation, effectively direct it to a feeding screw and discharge it at a substantially constant rate and pressure without requiring more of the operator than to keep the apparatus supplied with material.

Another object is to provide a feeding device having its own power unit and providing a self-contained feeding unit adapted for attachment to conventional forming machines, such as extruders, when the same are to be used on materials requiring positive pressure feed.

Other objects and advantages will in part appear and in part will be evident to those skilled in the art from the following detailed description of the present preferred embodiment of the invention, taken in conjunction with the drawings in which:

Fig. 3 is an enlarged horizontal section through interior parts taken on the line $3^x$—$3^x$ of Fig. 2; and Fig. 4 is an enlarged horizontal section taken on the line $4^x$—$4^x$ of Fig. 2.

The invention comprises the features of construction, combinations of elements, and arrangement of parts which are exemplified in the embodiment described herein by way of illustration, which embodiment may be modified in various ways without departing from the spirit of the invention. In its broad aspect the invention comprises a tubular member through which material is propelled into the feeding orifice of a forming machine, a hopper or container for the material to be fed which has its discharge end in communication with the tubular member, a feeding screw which extends from the hopper into the bore of the tubular member and is rotated so as to propel the material from the hopper out through said bore, and an agitator or primary feeding device which rotates with the screw and within the hopper to assure a constant movement of the material through the apparatus.

Figure 1:
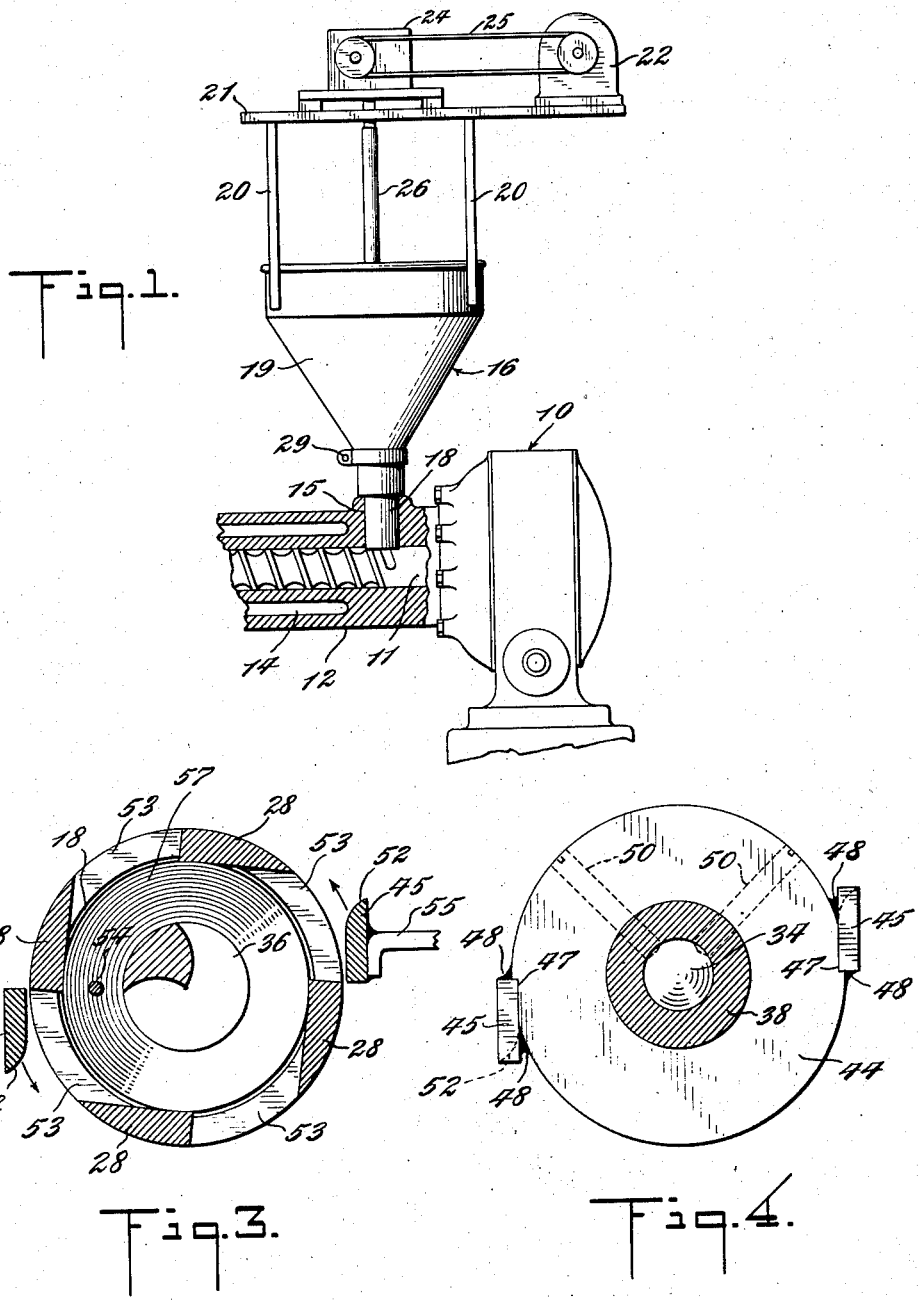
Fig. 1 is an elevation of a part of an extruder showing the feeding device in place, some parts being broken away and some parts being in section.

Referring to the drawings, there is shown in Fig. 1 an elevation of the feeding device applied to an extruder 10 which has the usual feed screw 11 rotating in a cylindrical casting 12 provided with a steam or water jacket 14 and a material receiving opening 15. The opening 15 is ordinarily simply a passage through the casting 12 into which the material to be extruded is fed.

Whether or not the screw 11 receives a sufficient supply of material at the proper rate is ordinarily dependent upon the nature of the material and the attention given to the feeding thereof by the operator. Some particulate materials are of a fluffy or loose character and may even have a certain amount of resilience so that unless they are constantly tamped into the orifice 15, the delivery of the material to the extruder may be exceedingly irregular. This is a great disadvantage in many instances because the output from the extruder will not be uniform as to rate or as to the time the material may be subjected to treatment by heat or pressure in passing therethrough and the constant attention of an operator is required to bring about uniformity.

The feeding device of the invention, generally indicated at 16, is adapted for insertion in the orifice 15, and overcomes these difficulties by providing a constant uniform delivery of material to the feed screw 11.

The main parts of the feeding device shown in Fig. 1 are a member or throat piece 18 having an external form adapted to fit tightly in the orifice 15, a material receiving hopper 19 above which is mounted, on suitable supporting members 20 and 21, driving means comprising a motor 22 and a reducing gear unit 24 connected by a belt 25. A shaft 26 extends downwardly from the unit 24 for operating the feeding device.

Figure 2:
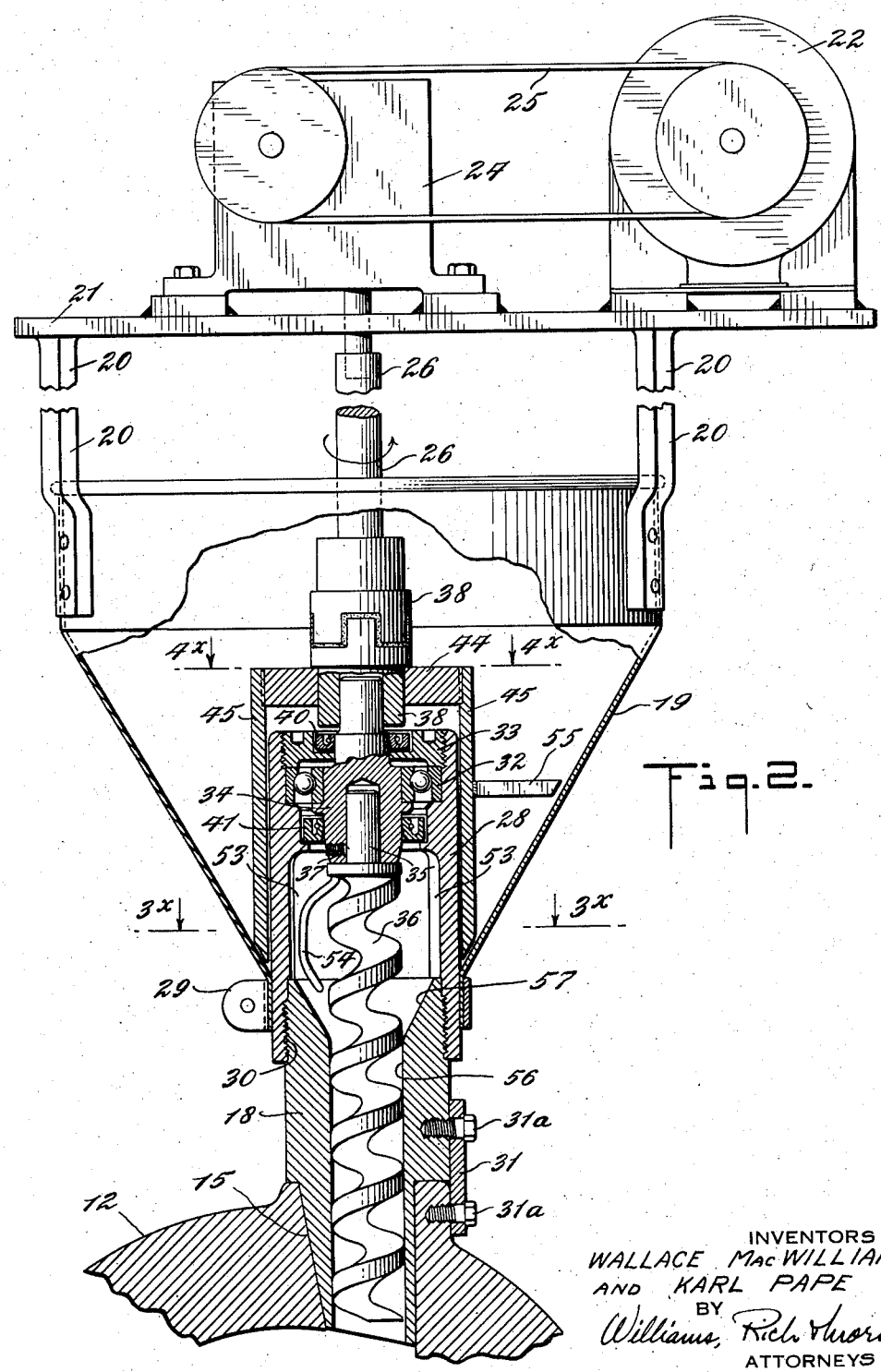
Fig. 2 is an elevation of the complete feeding device with part of the hopper broken away, showing most of the working parts in section, and showing attachment to an extruder.

Referring to Fig. 2, it will be seen that within the lower part of the hopper 19 and extending upwardly from its discharge end, which is at the bottom, is a generally cylindrical support 28 to which the hopper is fastened by the clamp 29. The lower part of member 28 is internally threaded at 30 to receive the throat piece 18. This construction makes it possible to use interchangeable throat pieces adaptable to feeding orifices of various shapes and sizes. The entire device, in this embodiment, is supported upon the throat piece 18 which should have a good fit in the orifice 15, both for giving the desired stability and preventing leakage. The throat piece may be securely held in place by means of a lug 31 which is fastened at one end to the casting 12 and at the other end to the throat piece 18 by bolts 31a screwed into tapped holes provided for that purpose.

The construction shown, wherein the hopper 19 is clamped to the support 28, permits the hopper and the driving mechanism carried thereby to be turned to any convenient position and it will be observed that these parts are shown in Fig. 2 in a position at right angles to that in which they are shown in Fig. 1. To prevent rotation of the parts relative to the throat piece 18, the lower part of support 28 may be split, if desired, so that tightening clamp 29 will lock the threads 30.

The support 28 is internally machined in its upper end to provide a seat for a radial thrust bearing 32 which is held in place by a clamping ring 33 screwed into the top of the support 28.

Mounted in the bearing 32 is a rotatable screw holder 34 drilled out at its lower end to receive the cylindrical butt 35 of a feed screw 36 which is held in place by set screws 37. The screw holder 34 is connected to the drive shaft 26 by means of a self-alining coupling 38.

Rotation of shaft 26, therefore, is communicated to the feed screw 36 through the screw holder 34 which rotates with the inner race of bearing 32. On either side of this bearing are oil seals 40 and 41 of any suitable type which retain in place the lubricant for the bearing and at the same time seal the bearing cavity against the entry of material in the hopper 19.

Mounted on the lower end of the coupling 38 for rotation therewith is a disc 44 on either side of which are fastened downwardly extending agitator or primary feeding blades 45. Referring to Fig. 4, it will be seen that the disc 44 is circular and provided at opposite sides with notches 47 in which the blades 45 are seated and secured as by welds 48. The screw holder 34, coupling 38 and disc 44 are all held together by means of set screws 50 which extend through alined threaded holes through the disc and coupling and bear against the screw holder.

Referring to Fig. 3, it will be seen that the feeding and agitating blades 45 are rounded or beveled on their inner surfaces, as shown at 52 and will travel around the support 28 in a substantially tangential position so that they will act to scoop material in the hopper 19 toward the support 28. In the lower part of this support, below the oil seal 41, there are provided a plurality of openings or ports 53, four in the embodiment shown, which are cut through the wall at such an angle as to provide a minimum resistance to the flow of material therethrough under the action of the blades 45. As may be seen from the drawing, the angle of the openings 53 and their extent are such that one wall of each port is approximately tangential to the inner wall of the support 28, which is the wall of the chamber therein, and the other walls of the ports cut the member 28 substantially at right angles. These openings provide communication between the lower part of the hopper and the chamber inside of the support 28 in which the upper part of screw 36 rotates.

It will thus be seen that when the device is operating the blades 45 will constantly agitate the material in the hopper, so as to prevent caking and break up lumps, and will at the same time propel the material through the openings in the support 28 toward the feed screw. A supplementary agitator 54 may be attached to the feed screw to agitate the material in the chamber adjacent the upper part of the screw. One or more supplementary agitators may be fastened to the blades 45, if desired, as shown at 55, to more thoroughly stir up the material in hopper 19.

The cylindrical bore 56 in the throat piece 18 is flared at its top so as to form a funnel, as shown at 57, and facilitate the flow of material. Once the material gets into the cylindrical bore, it is positively conveyed by the feed screw through the opening into which the device is inserted and the flow of material will be constant and at a steady pressure as long as the device is operated. All that is required of the operator is to keep the hopper 19 filled with material.

The electrical circuit for the motor 22 may conveniently be so coupled with the driving mechanism of the extruder 10 that they will be started and stopped together so that the feeding device will not force material into the extruder unless it is operating.

While the device described above is of a simple and rugged construction and easily manufactured, it is obvious that certain changes might be made in the details thereof without departing from the invention as defined in the appended claims and, therefore, the foregoing details are to be construed as merely illustrative and not as limitations of the invention.

What is claimed is:
1. In a feeding device for particulate materials, in combination: a supporting member generally circular in cross-section, having a chamber throughout a portion of its length, having ports opening into said chamber, and a bearing support adjacent said chamber; a feed screw supported in said bearing and extending through said chamber; an agitator comprising a blade extending longitudinally of said member adjacent the outer surface thereof and past said ports, and rotatable thereabout for moving material through said ports; means for rotating said screw and said agitator; and a hopper surrounding said member for holding a supply of material to be fed.

2. In a feeding device for particulate materials, in combination: a supporting member generally circular in cross-section, having a chamber throughout a portion of its length, having ports opening into said chamber, and a bearing support adjacent said chamber; a feed screw supported in said bearing and extending through said chamber; an agitator comprising a blade extending longitudinally of said member adjacent the outer surface thereof and past said ports, and rotatable in an approximately tangential position about said member for moving material through said ports; means for rotating said screw and said agitator; and a hopper surrounding said member for holding a supply of material to be fed.

3. In a feeding device for particulate materials, in combination: a supporting member generally circular in cross-section, having a chamber throughout a portion of its length, having ports opening into said chamber with one wall of each port approximately tangential to the wall of said chamber, and a bearing support adjacent said chamber; a feed screw supported in said bearing and extending through said chamber; an agitator comprising a blade extending longitudinally of said member adjacent the outer surface thereof and past said ports, and rotatable with said screw; means for rotating said screw; means for rotating said agitator in a direction to propel material toward the tangential walls of said ports; and a hopper surrounding said member for holding a supply of material to be fed.

4. In a feeding device for particulate materials, in combination, a member having a cylindrical bore open at one end and communicating with a chamber in said member at the other end, that portion of said member containing said chamber having an externally cylindrical apertured wall, a hopper surrounding said wall for holding a supply of material, feeding means mounted for rotation around said wall and within said hopper and adapted to propel material in the hopper through the apertures in said wall into said chamber, a feeding screw extending through said chamber and into said bore, and means for rotating said feeding means and said screw in such directions as to expel material from the open end of said bore.

5. In a feeding device for particulate materials, in combination, a member having a cylindrical bore open at one end and communicating with a chamber in said member at the other end, a bearing carried by said member adjacent the end of said chamber opposite said bore, that portion of said member containing said chamber having a generally cylindrical apertured wall, a hopper surrounding said wall for holding a supply of material, feeding means mounted for rotation adjacent said wall and within said hopper adapted to direct material in the hopper through the apertures in said wall into said chamber, a feeding screw rotatably supported by said bearing and extending through said chamber and into said bore, and means for rotating said feeding means and said screw in such directions as to expel material out of the open end of said bore.

6. In a feeding device for particulate materials, in combination, a generally cylindrical support having a chamber and ports in its wall opening into said chamber, a bearing carried by said support adjacent said chamber, a member rotatably mounted in said bearing, a feed screw fixed to one end of said member and extending through said chamber, feeding and agitating means fixed to the other end of said member and extending along the outside of said support, a hopper for holding a supply of material around said support, and means for rotating said member to drive said feed screw and said feeding and agitating means whereby material in said hopper will be moved through said ports toward said feed screw.

7. In a material feeding device, in combination, feeding means for propelling particulate materials, a hopper for retaining material and supplying it to said means, means for adjustably securing said hopper to said feeding means whereby they may be relatively rotated, supporting members carried by said hopper, driving means mounted on said members, and means for operatively connecting said driving means to said feeding means.

8. In a material feeding device adaptable for attachment to apparatus having a material-receiving opening, feeding means for propelling particulate materials including a feed screw, a throat piece having a bore in which said feed screw operates and having an external configuration to fit in said opening, and means for removably attaching said throat piece to said feeding means whereby the throat piece may be interchanged with other throat pieces of different external configuration.

9. In apparatus for feeding particulate materials, the combination with a cylindrical member having a chamber and ports through its walls opening into said chamber in a non-radial direction with one wall of each port approximately tangential to the wall of said chamber, of feeding means comprising a blade adapted for rotation about said member adjacent said ports in a position approximately tangential to the outer wall of said member, and means for rotating said feeding means in a direction to propel material toward the tangential walls of said ports.

WALLACE MacWILLIAM.
KARL PAPE.